(12) United States Patent
Kontothanasis et al.

(10) Patent No.: US 12,346,754 B2
(45) Date of Patent: Jul. 1, 2025

(54) METHOD, SYSTEM, AND SERVER FOR REDUCING NOISE IN A WORKSPACE

(71) Applicant: RINGCENTRAL, INC., Belmont, CA (US)

(72) Inventors: Epameinondas Kontothanasis, Athens (GR); Sofia Anagnostou, Athens (GR); Kleoniki Markou, Attiki (GR); Zisis Tsiatsikas, Salonika (GR)

(73) Assignee: RingCentral, Inc., Belmont, CA (US)

( * ) Notice: Subject to any disclaimer, the term of this patent is extended or adjusted under 35 U.S.C. 154(b) by 104 days.

(21) Appl. No.: 16/772,866

(22) PCT Filed: Dec. 20, 2018

(86) PCT No.: PCT/EP2018/086422
§ 371 (c)(1),
(2) Date: Jun. 15, 2020

(87) PCT Pub. No.: WO2019/129669
PCT Pub. Date: Jul. 4, 2019

(65) Prior Publication Data
US 2021/0173725 A1    Jun. 10, 2021

(30) Foreign Application Priority Data
Dec. 29, 2017 (EP) .................................... 17211179

(51) Int. Cl.
*H04M 3/00* (2024.01)
*G06F 9/54* (2006.01)
(Continued)

(52) U.S. Cl.
CPC ............ *G06F 9/542* (2013.01); *H04L 67/10* (2013.01); *H04M 3/568* (2013.01); *H04M 9/02* (2013.01); *H04R 3/04* (2013.01); *H04R 2430/01* (2013.01)

(58) Field of Classification Search
CPC .... H04M 7/006; H04M 1/72463; H04M 3/42; H04M 3/568; H04M 1/72454;
(Continued)

(56) References Cited

U.S. PATENT DOCUMENTS 8,675,853 B1 * 3/2014 Guilfoyle ............ H04M 3/2281
379/202.01
8,948,415 B1 * 2/2015 Reid .................. H04W 52/0238
455/574
(Continued)

FOREIGN PATENT DOCUMENTS

EP     2405634     1/2012

OTHER PUBLICATIONS

International Search Report from corresponding International Application No. PCT/EP2018/086422 dated Mar. 14, 2019 (four pages).

*Primary Examiner* — Kharye Pope
(74) *Attorney, Agent, or Firm* — Finnegan, Henderson, Farabow, Garrett & Dunner, LLP

(57) ABSTRACT

A method, a system, and a server for reducing noise in a workspace are disclosed. The workspace may have a plurality of terminals connected to a server via a communication network. The method may include detecting a noise level, which is above a predetermined threshold value, in or adjacent to at least one of the terminals. The noise level in or adjacent to a terminal may be detected by monitoring noise emitted from or in the vicinity of that terminal by a microphone associated with that terminal. The method may also include identifying the terminal at which the noise level exceeds the predetermined threshold. Further, the method may include initiating a measure for reducing the noise level.

16 Claims, 4 Drawing Sheets

Figure 1:
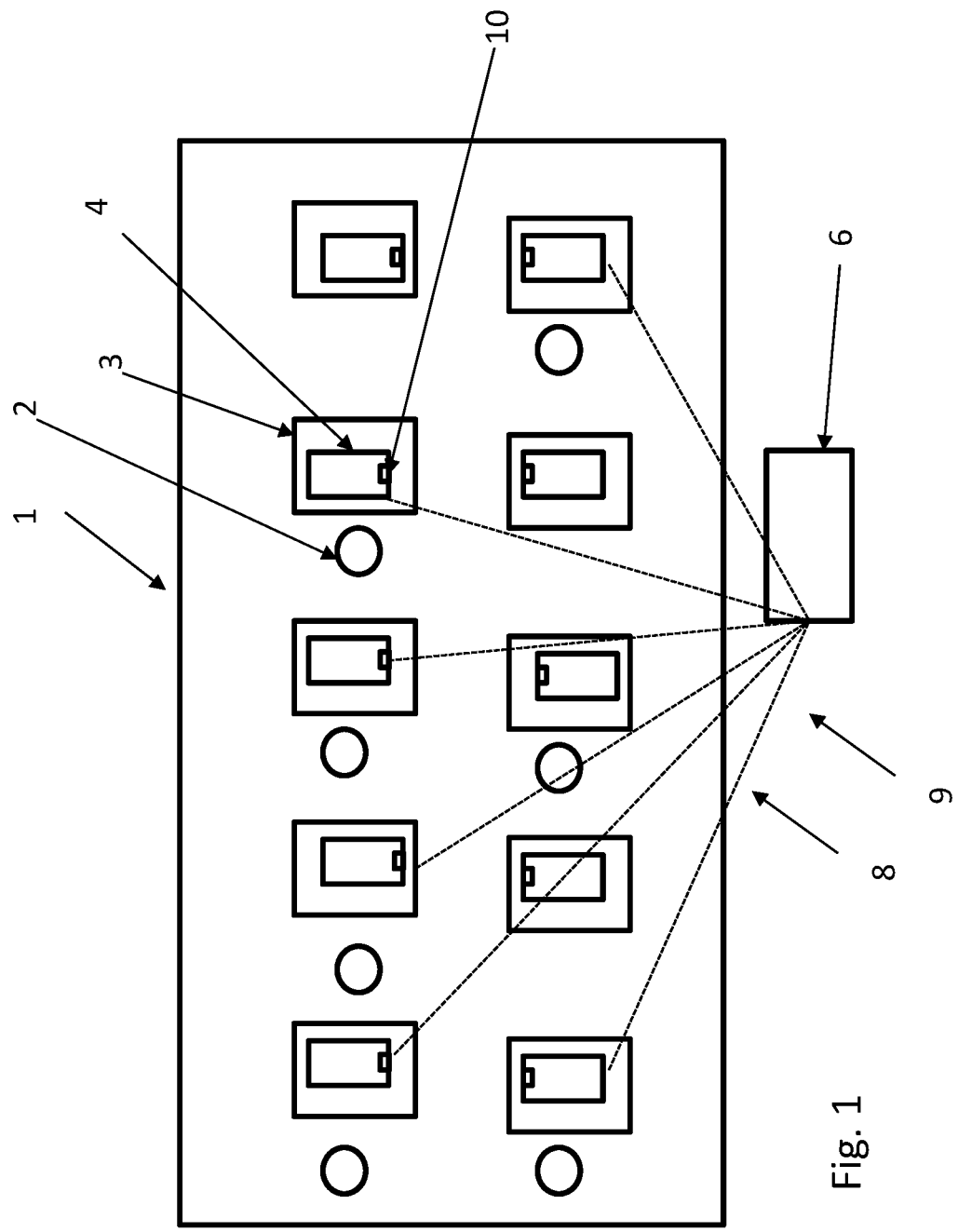

(51) Int. Cl.
*H04L 12/66* (2006.01)
*H04L 67/10* (2022.01)
*H04M 3/56* (2006.01)
*H04M 5/00* (2006.01)
*H04M 9/02* (2006.01)
*H04R 3/04* (2006.01)

(58) Field of Classification Search
CPC ........... H04M 19/044; H04M 3/42374; H04M 2250/62; H04M 3/56; H04M 3/566; H04M 3/567; G10L 21/028; G10L 15/22; G10L 21/034; H04L 65/403; H04L 12/1822; H04L 43/16; H04L 63/0861; H04L 12/1818; H04L 12/1827; G08B 23/00
USPC ................... 379/39; 340/392.3, 7.58; 381/56
See application file for complete search history.

(56) References Cited

U.S. PATENT DOCUMENTS

| | | | | |
|---|---|---|---|---|
| 2002/0145521 | A1 | 10/2002 | Chou et al. | |
| 2006/0167995 | A1 | 7/2006 | Rui | |
| 2007/0127668 | A1* | 6/2007 | Ahya | H04M 3/568 379/202.01 |
| 2008/0101557 | A1* | 5/2008 | Boss | H04M 1/6033 379/88.08 |
| 2009/0168984 | A1* | 7/2009 | Kreiner | G06F 3/165 379/202.01 |
| 2009/0225970 | A1* | 9/2009 | Grigsby | H04R 27/00 379/202.01 |
| 2010/0080374 | A1* | 4/2010 | Hepworth | H04M 3/568 379/202.01 |
| 2011/0280387 | A1* | 11/2011 | Soo | H04M 3/56 379/202.01 |
| 2012/0014514 | A1* | 1/2012 | Enbom | H04M 3/18 379/32.01 |
| 2012/0110196 | A1* | 5/2012 | Balasaygun | H04M 3/567 709/228 |
| 2013/0028404 | A1* | 1/2013 | O'Malley | H04M 3/567 379/202.01 |
| 2013/0064392 | A1* | 3/2013 | Sugiyama | G10L 21/0208 381/94.1 |
| 2013/0120522 | A1* | 5/2013 | Lian | H04N 7/15 348/E7.083 |
| 2013/0182064 | A1* | 7/2013 | Muench | H04M 3/568 379/202.01 |
| 2013/0329863 | A1* | 12/2013 | Bentley | G08B 23/00 379/32.01 |
| 2015/0063553 | A1* | 3/2015 | Gleim | H04N 7/15 379/202.01 |
| 2015/0110277 | A1* | 4/2015 | Pidgeon | H04R 3/00 381/56 |
| 2015/0179186 | A1 | 6/2015 | Swierk et al. | |
| 2015/0279386 | A1* | 10/2015 | Skoglund | G10L 21/0208 704/226 |
| 2016/0142451 | A1* | 5/2016 | Ouyang | H04L 65/403 715/728 |
| 2016/0373691 | A1* | 12/2016 | Diao | H04L 12/1822 |
| 2018/0048767 | A1* | 2/2018 | Tinsman | H04L 41/0681 |
| 2018/0048768 | A1* | 2/2018 | Spittle | H04M 3/568 |
| 2019/0068389 | A1* | 2/2019 | Chitre | H04L 12/1863 |
| 2019/0104280 | A1* | 4/2019 | Bastide | H04N 7/15 |

* cited by examiner

METHOD, SYSTEM, AND SERVER FOR REDUCING NOISE IN A WORKSPACE

CLAIM FOR PRIORITY

This application is a U.S. National Phase entry under 35 U.S.C. § 371 from PCT International Application No. PCT/EP2018/086422, filed Dec. 20, 2018, which claims benefit of priority of European Patent Application No. 17211179.1, filed Dec. 29, 2017, the entire contents of all of which are incorporated herein by reference.

The present invention relates to a method for reducing noise in a workspace, a system for carrying out the method, as well as a server.

Open space workplaces are widely known in business environments. In such open space workplaces, rather than providing small individual private offices, a floor plan making use of a large, open space is implemented in which a number of people have their desktops for doing their work.

While, on the one hand, the above concept of an open space workplace may have certain advantages, like for example, inspiring collaboration or research, they also involve various disadvantages for the employees. For example, visual privacy, sound privacy, and the sound level are typical problems regarding open-plan offices.

Especially when having to perform a task which requires a high level of concentration, noise is a severe problem and may even entail a person making mistakes when subject to a high noise or sound level.

The same problem with respect to noise may arise regarding conferences. Especially video or audio conferences with people not being collocated may be problematic, when noise is emitted from a person or his/her terminal he or she is using for participating in the conference. Due to different locations of the participants, it might not be easy to locate the person or terminal emitting sounds or noise disturbing the conference.

Therefore, the present invention is based on the object of providing a method and a system for reducing noise in a workspace which enables the detection and removal of a disturbing noise or sound source.

According to the invention, this problem is solved by a method for reducing noise having the features according to claim 1, a system for carrying out the method having the features according to claim 14, and a server having the features according to claim 15.

Thus, according to the invention, a method for reducing noise in a workspace comprising a plurality of terminals connected to a server via a communication network is provided, the method comprising the steps of detecting a noise level present at at least one of the plurality of terminals, which is above a predetermined threshold value; identifying the at least one terminal at which the noise level above the predetermined threshold has been detected; and initiating a measure for reducing the noise level, wherein detecting the noise level is achieved through monitoring noise emitted from or in the vicinity of the respective terminals of the plurality of terminals, by recording means assigned to the respective terminals of the plurality of terminals.

By the inventive method, if during a conference with a certain number of participants which are not collocated, or in an open space workplace in which a plurality of people are working, a noise or sound source emanating from one of the participants, employees, or even from their terminal devices is disturbing the work of the others, then the noise or sound source may be detected immediately, either automatically or triggered by a disturbed participant or employee, it will be identified, and then eventually eliminated, for example, by either muting a terminal device or by indicating, to the disturbing employee, that he or she is too loud for the others and therefore should be more silent so that the others are able to concentrate on their work, or in a conference, to listen to the content of the conversation.

According to a preferred embodiment, the workspace is given by the plurality of terminals being located in one common office room, or wherein the workspace is a virtual workspace defined by at least some of the terminals of the plurality of terminals being located in different locations.

According to another preferred embodiment, the terminals of the plurality of terminals are computer devices, handheld devices, in particular, mobile phone devices, or stationary telephone devices.

Preferably, the step of detecting the noise level is started, when a user of the at least one terminal is logged into the communication network.

Further, the step of monitoring may comprise a step of recording the noise for a predetermined period of time, after it has been detected that the noise level is above the predetermined threshold value.

Moreover, it is advantageous, if the step of identifying the at least one terminal further comprises a step of sending a notification to the server comprising information on the recording of noise from the at least one terminal.

According to still another preferred embodiment, the recording means for carrying out the detection is a microphone respectively associated with or integrated into each terminal of the plurality of terminals.

The monitored noise may be noise, in particular, sound or background noise, emitted from a user of a respective terminal of the plurality of terminals or in the vicinity of the user, and/or the monitored noise is noise emitted from the monitored terminal itself, in particular, from backcoupling effects.

Preferably, the step of initiating measures for reducing the noise level includes at least one of
  automatically muting the at least one terminal identified in the identifying step;
  sending a notification to the terminal identified in the identifying step that a predetermined noise level is exceeded and is to be reduced; and
  pressing a button, in particular, a button on a keyboard of a terminal of the plurality of terminals, which indicates, at the terminal identified in the identifying step that a predetermined noise level is exceeded and is to be reduced.

According to another preferred embodiment, the server collects noise level data of all terminals of the plurality of terminals which are logged into the communication network as sample data.

The method may further comprise providing a button on each terminal of the plurality of terminals which, when activated, triggers the step of detecting the noise level at the other terminals of the plurality of terminals, wherein when the button is activated at at least one terminal of the plurality of terminals, the method further comprises a step of transmitting a location identification from that terminal.

Also, it is advantageous, if the step of monitoring further comprises a step of analyzing the noise levels at or in the vicinity of the terminals of the plurality of terminals, wherein the analyzing step comprises the step of carrying out a spectrum analysis of background noise at the terminal, at which the step of detecting the noise level has been triggered.

According to still another preferred embodiment, he predetermined threshold value is based on a configurable percentage above an average noise level of a period of time detected and monitored over a previous period of time.

Preferably, the server in the virtual workspace comprises an application for performing an Internet-based video and/or audio conference with a plurality of participants using terminals which are not collocated.

Moreover, according to the present invention, a system for carrying out the method is provided, wherein the system comprises a plurality of terminals connectable to a server via a communication network, and further comprises detection means for detecting a noise level at at least one of the plurality of terminals, which is above a predetermined threshold value;
 identification means for identifying the at least one terminal at which an increased noise level has been detected;
 initiation means for initiating measures for reducing the noise level, and
 monitoring means for continuously monitoring noise emitted from or in the vicinity of the respective terminals of the plurality of terminals by recording means assigned to the respective terminals of the plurality of terminals.

Further, according to the present invention, a server is provided to which a plurality of terminals are connectable via a communication network, the server being adapted for controlling means for controlling the plurality of terminals to detect noise level which is above a predetermined threshold value;
 identification means for identifying the at least one terminal at which an increased noise level has been detected;
 initiation means for initiating measures for reducing the noise level, and
 monitoring means for continuously monitoring noise emitted from or in the vicinity of the respective terminals of the plurality of terminals by recording means assigned to the respective terminals of the plurality of terminals.

The system and server according to the present invention provide the advantages mentioned above.

In summary, a disturbing terminal may be muted automatically so as to prevent further noise being emitted, or a person may be asked for silence by a corresponding indication so that other employees are able to concentrate on their work or, in a conference, to listen to the content of the conversation.

The invention and embodiments thereof are described in connection with the drawing.

Figure 2:
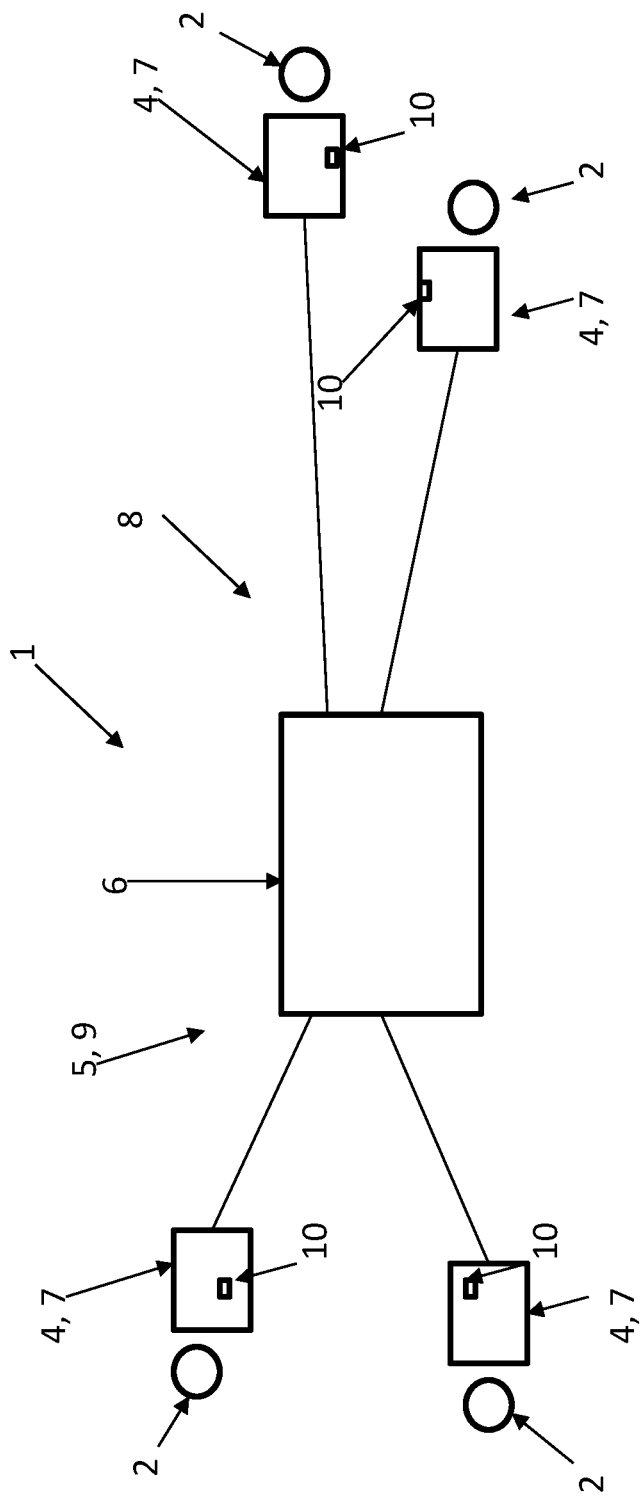
Figure 3:
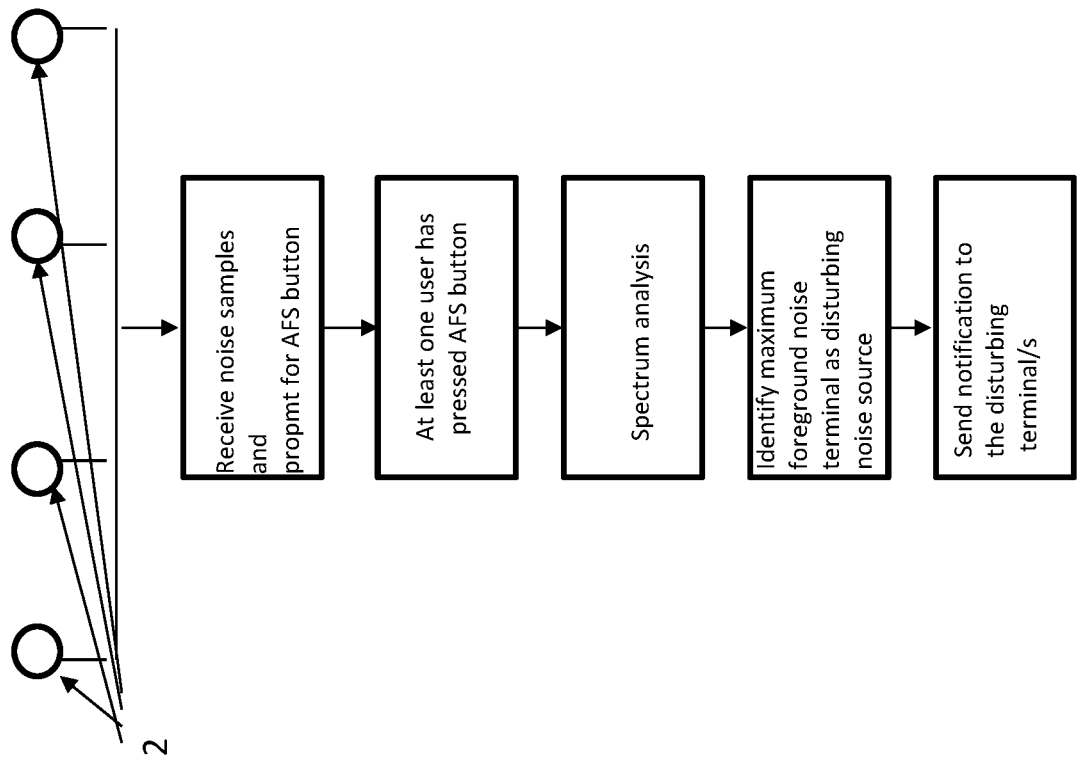
Figure 4:
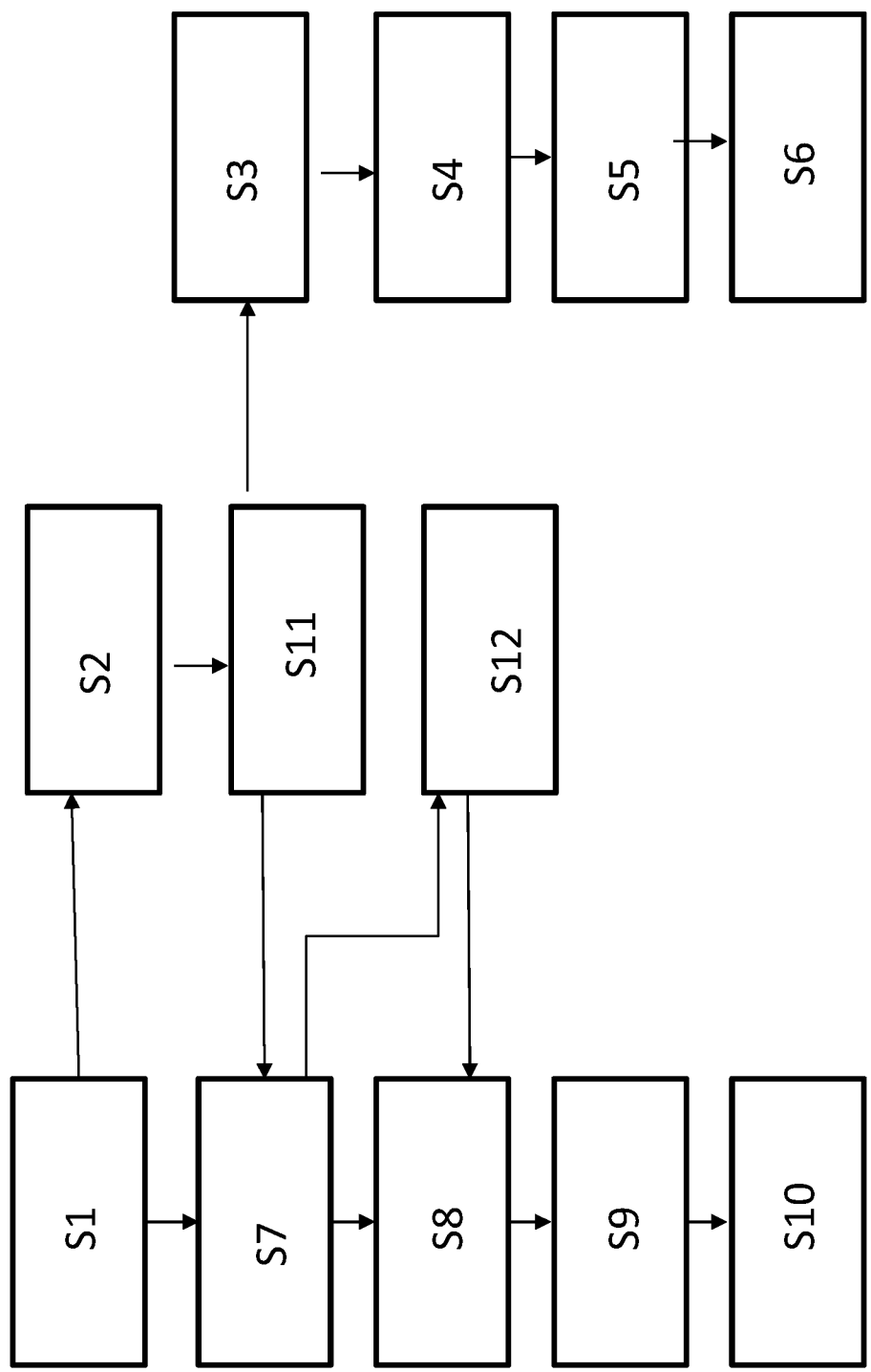

FIG. 1 schematically illustrates an open work space environment;

FIG. 2 schematically illustrates a communication and collaboration platform;

FIG. 3 shows a flowchart illustrating an embodiment of the method for reducing noise; and FIG. 4 shows a flowchart illustrating a further embodiment of the method for reducing noise.

FIG. 1 schematically illustrates an open work space environment 1, which in this embodiment is an office with an open plan in which a plurality of people 2 or employees, in the following referred to as users 2, are working at respective individual desks 3 respectively equipped with a terminal 4. A terminal 4 may be a computer device which is connectable to a communication network, a telephone device or the like. The terminal 4 is equipped with a recording device for recording (or picking-up) sound or noise, which may be a microphone 10 integrated into the terminal or a separate microphone located nearby the terminal, for example, on the desk 3 on which the terminal 4 is placed. As can be seen, not all desks 3 are occupied. At the desks which are occupied, the user 2 as he or she starts his work logs into the enterprises' communication and collaboration system 9 thereby connecting the terminal 4 to a server 6 of the system via a communication network 8. It is noted that also, for example, a library in which a plurality of users 2 are reading books at monitors of designated terminals 4 is conceivable as such an open work space environment 1.

FIG. 2 schematically illustrates an internet-based communication and collaboration platform 5 for performing, for example, an audio or video conference with a plurality of participants who are not collocated. This figure only is supposed to show the basic principle of the concept of performing a remote video or audio conference; therefore, the components and the specific procedure are not described in further detail, but they are commonly known.

Thus, the communication and collaboration platform 5 basically comprises a communication server 6 on which a communication and collaboration application runs, and a plurality of clients 7 which are connected or connectable to the communication server 6 via a communication network 8 like the Internet. For example, a participant who wants to participate in a video or audio conference remotely, in the following also referred to as user 2, then logs into or connects to the server 6 with an appropriate terminal 4 or device, as for example, a mobile phone equipped with the required means. As soon as the connection is established and the connection of other participants or users 2 has been established, the latter will be able to communicate on a specific topic remotely.

FIG. 3 shows a flowchart illustrating an embodiment of the method for reducing noise. This example refers to an open space workplace 1, as illustrated schematically in FIG. 1. In this scenario, a plurality of users 2 is working in a common office, whereby one of the users 2 starts talking loudly on the phone or to a colleague so that the at least one other user 2 is disturbed and no longer is able to concentrate on his or her work. Depending on the noise or sound which is emitted from this noise source, also more than one user 2 might feel disturbed. In any case, the situation requires to find the noise source and eliminate it, for example, by asking the respective user 2 for silence.

In this scenario, therefore, a number terminals 4, as computers or handheld devices, as mobile phones, are connectable to an enterprise network as outlined with respect to FIG. 1. A user 2 when he or she starts his or her work logs into the enterprise system 9 so that a connection is established via the network 8 from the terminal 4 to the server 6, and his or her presence at a respective terminal 4 is noted and may be identified, for example, for the time of the working session. The open space workplace also is assumed to be configured such that the users 2 may talk on the phone while doing their work speaking with a normal volume without disturbing the other users 2 in the office as long as there is no other significant external or internal noise or sound present.

However, as mentioned above, in this scenario it is assumed that one user 2 starts causing noise inside the open space office. The general procedure is described below.

In this embodiment, every terminal 4 in which a user 2 has logged in, in the following referred to as an active terminal, is equipped so as to monitor a local noise average, for example, by means of a microphone integrated into the terminal 4 or a separate microphone located in the vicinity of the terminal 4, for a predetermined period of time, as for example for 10 seconds or 60 seconds or any period of time which is suitable. This period of time for monitoring the noise average for all terminals 4 starts at the same time whereby audio samples are collected for every active terminal 4 in the office. If it is detected, however, that the noise or sound at one of the active terminals 4 exceeds a certain predetermined threshold value which in this embodiment is a dynamic threshold, the noise at the terminal 4 will be recorded whereby only the last seconds, for example, the last 5 seconds or another appropriate value which may be preset, of the audio sample are kept. Then, the server 6 of the enterprises' system 9 will be notified that a specific terminal 4 is above the threshold value and, thus, emits disturbing sounds or noise. The expression of a specific terminal 4 emitting noise or sound also encompasses noise or sound of the user 2 working at the specific terminal 4, or even sound or noise emitted by user 2 standing nearby or in the immediate vicinity of that terminal 4. With the notification concerning the detection of disturbing noise or sound, also specific terminal 4 will be identified to the server 6, for example, by sending a location identifier from the terminal 4 to the server 6. It is noted that in this embodiment, the average noise mentioned above is measured in decibel per hour (db/h).

As soon as the server 6 receives the above information, it will transmit a notification to that specific terminal 4 comprising, for example, a message asking for silence. If it has been detected that not only one specific terminal 4 is emitting disturbing noise or sound, but also a second terminal 4 or more, then the same procedure applies and the users 2 of these terminals 4 are informed accordingly.

The above procedure may be performed automatically or may be triggered, in an embodiment, by one of the users 2. In this case, a user 2 who feels disturbed by noise or sounds of other users 2 in the same room or open space workplace environment 1, presses a button provided for example, on a keyboard or an icon on a monitor the like at the terminal 4. This button is referred to an "ask-for-silence"-button (AFS button). Upon pressing the AFS button, the server 6 will start downloading sample data from all users of a list. The list may comprise, for example, all users 2 who have logged into the system. The list itself may, for example, be held in a storage of the server 6.

As soon as the server 6 has collected all noise samples, as described above, it will start the following procedure, shown in the figure. Namely, then, the background noise from the user 2 who pressed the AFS button will be spectrum analyzed and will be compared with all other foreground samples monitored and collected at the other terminals 4 comprised in the list. From the list of sample data, all matching samples are selected and the one with the maximum value for noise in db/h (meaning the sample with maximum background noise) will be determined to be the disturbing terminal 4. Then, the user 2 of the disturbing terminal 4 is notified, thereby, asking him for silence so as to reduce noise.

If, however, a user 2 or his terminal 4, respectively, is notified and asked for silence who, in fact, is not the one emitting disturbing noise or sounds, then a further button may be provided, for example, as an icon on a monitor or on a keyboard or the like, which indicates that this user 2 is not emitting disturbing noise. This button is referred to an "Its-not-me"-button (INM button). If this button is pressed by a user 2 and a corresponding notification is sent to the server 6, then the server 6 will continue to notify a user 2 from in the rest of users on the list with the next or second maximum background noise.

If all users 2 in the open space workplace environment 1 connected to the server 6 press the INM button, then the server 6 will send a second notification asking for silence to the user 2 notified first in the procedure, whereby the INM button will be deactivated or will not be enabled. In such a case, even if this user 2 is not creating the noise himself, for example, in a scenario in which other people standing right next to his terminal 4 are talking loud, he is reminded that there is excessive noise in his environment so that he or she should be responsible for stopping it.

It is noted that disturbing noise—although due to the perception of an individual being a relative value—in the embodiment is defined as a noise level comprising for example, noise and sounds, above a certain predetermined threshold value. The threshold value here is a configurable percentage above the average noise level of the previous hour in the room or open space workplace environment 1, comprising noise and sound like cars passing by outside of the room, noise from an air conditioning system, speech, backcoupling effects or the like. It further is noted that the human brain is able to cope with noise of a medium intensity, and after a while will filter this noise out. For example, some sounds or kind of noise might be disturbing in the morning, but in the afternoon, the same sounds or noise might not be perceived as disturbing any more.

According to a further embodiment, in which for example, handheld and mobile devices are excluded as terminals 4, the relative distance from one terminal 4 to another one or to all other ones is known. In this embodiment, the terminals 4 are referred to as endpoints. Thus, if there is a number of N endpoints, a matrix of $(N*(N-1))/2$ distances is obtained (expressed in meters, steps, inches, or any other suitable measure). In this embodiment, when a user presses the AFS button, noise samples are downloaded by the server in a similar way as described above, but instead of performing a spectrum analysis, a value for db/h is calculated under consideration of the distances between the terminals 4 whereby this value in db/h indicates the noise that the user 2 who pressed the AFS button is supposed to receive from all other terminals 4 in the room. The server 6 now evaluates an average value in db/h from all noise samples instead of the actual audio samples mentioned above. The user 2 or terminal 4 which can be assigned to the maximum value is selected to be the disturbing noise source, and will be informed according to the procedure outlined above accordingly.

It is noted that both approaches outlined above may also be combined so as to make the final algorithm more robust. If the relative location, however, is not known, for example, when users 2 use mobile devices as terminals 4 and move around during work, then the first approach is applicable only.

In a further embodiment, also a further button may be provided, namely, a so-called "Am-I-annoying" button (AIA button) which may be pressed by a user 2 so as to find out if he is considered to be a disturbing noise source for the other users 2.

According to still a further embodiment, another button may be provided, namely, a so-called "voting" button which may be used to express the individual or personal level of disturbance and which enables other users 2 to vote for a user 2 or terminal 4 being too loud and thus disturbing. For example, in an open space workplace as described above or in a library, a voting system can be applied by logging into it first, and then every user 2 who is logged in will be able to anonymously submit a number or another value indicating how much he or she is annoyed or disturbed by the local background noise. This user 2 also has to submit his location identifier in order keep the system design simple. If the number of votes exceeds, for example, a certain threshold value, then a notification will be generated asking the disturbing user 2 or terminal 4 for silence. If multiple people, e.g. in a library, complain from a specific region, then the system will inform with a written message or announcement the group that is creating the noise and politely ask for silence.

FIG. 4 shows a flowchart illustrating a further embodiment of the method for reducing noise. In this case, the scenario of an audio or video conference is concerned, whereby the users 2 or participants are not collocated and participate in the conference remotely. In such a scenario, namely, during a conference that takes place between parties or participants that are not collocated, the system should also be able to detect the noise generating parties or participants or users 2, respectively, automatically and at the same time provide an AFS button so as to perform the procedure describe above for detecting the noise source and reducing or eliminating it as outlined above.

Such an "ask4silence" function or system may be integrated in a conference system as shown in FIG. 2, and should also be able to interact with it. For example, if a group emitting disturbing noise is detected which is, for example, not actually participating in the conference, then this group or individual will also be informed, for example, by means of e-mail, an announcement or an SMS, even without revealing who exactly is complaining. For example, a user 6 who is a passive participant in a conference meeting may not be aware that he or she has forgotten to unmute his terminal 4 so that he or she is not aware of disturbing the conference. This results in unintentionally introducing low level sounds which are very annoying to the other participants of the conference or users 2.

According to the embodiment described below, users 2 which represent disturbing noise or sound sources can be detected and informed accordingly so that the other conference participants will be able to follow the conversation undisturbed and therefore, more concentrated.

In the embodiment, a number of users 2 or participants take part, either actively or passively, in a conference which takes place in a virtual conference room. If the users 2 are participating actively, basically the same procedure as described above with respect to FIG. 3 will be carried out, whereby the only difference is that the users 2 are not staying in one and the same room, but rather are located at different locations and for participating in the conference, will log into the communication server 6 with a communication and collaboration application remotely via a communication network 8 like the Internet. For example, if a user 2 who feels disturbed by noise presses the AFS button, then the recorded (background) noise samples are downloaded one-by-one and are compared with the foreground noise, as outlined above. If a noise spectrum analysis matches, then the corresponding user 2 is notified and asked for silence.

In the case that a user 2 or a group of users is/are passive participant/s of a conference and his or her microphone of the terminal 4 used to participate may inadvertently introduce low level sounds into the conference. In case of using a virtual meeting room and a corresponding communication and collaboration application, the introduced noise may cause a profile picture of the user 2 the terminal 4 of whom introduces the noise to be shifted to the foreground in the virtual meeting room. Thus, this user will be aware that he or she has forgotten to mute his terminal 4. Additionally, according to another embodiment, the profile picture may be marked with a predetermined color so as to make it even more clear to the user 2 who is inadvertently introducing noise that he or she is a disturbing noise source in the conference.

In the following, the procedure shown in the flowchart of FIG. 4 is briefly outlined. In a first step, S1, it is verified which terminals are collocated. The terminals may either be added manually to collocated groups or individuals or automatically. If it is verified that one or more users are collocated in one room, then in step S2 it is determined that they are participating in a conference. In a further step S3, it is determined, if the users are active participants in the conference, for example, participants who currently are talking, or if they are passive, i.e., at that point of time, they are only listening to the taking person. In step S4 it determined that one or more users are introducing (inadvertently) low level sounds, detected by the microphones of the terminals used for participating in the conference, thereby causing disturbing noise. In step S5, the profile picture of the user on the terminal which has been determined to produce low level sounds is shifted to the foreground in the virtual meeting room and/or is marked with a colour, thereby, indicating to this user that he or she has forgotten to mute his device or terminal, for example, after having spoken previously. In step S6, an AFS button is presented, for example, on a monitor or screen of the device or terminal the respective participants are using, as an icon. By pressing the AFS button, the participants may vote that a specific user or participant or his terminal is causing undesired noise. In step S7, it is determined, if the votes exceed a predetermined threshold, and if this is the case, the user or terminal on which the vote has been made is muted automatically. Additionally, a notification may be sent to that user.

If the procedure follows the alternative path starting from step S1, then in a second step S8, there is a waiting and information loop until one of the users will press the AFS button. From here, there is an option to either follow step S12 or directly step S9. In step S12, the conference participants or users, either collocated or not, are asked to vote on whether the microphone of the user who pressed the AFS button in step S8 is introducing noise. The other option is to follow step S9, in which the sound or noise level or levels are calculated using the microphones of the individual terminals of the users participating in the conference. In the following step S10, it is determined whether the noise level is above a certain predetermined threshold value, or if the number of complaints or votes from other users is above a certain threshold value. Finally, if the threshold value is exceeded, then a notification or an announcement is sent to the user or his terminal identified to emit disturbing noise via e-mail, SMS or the like.

REFERENCE NUMERALS 1 open space workplace or room
2 user
3 desk
4 terminal
5 communication and collaboration platform
6 communication server
7 client
8 communication network
9 communication and collaboration system
10 recording means/microphone

The invention claimed is:

1. A method for reducing noise in a workspace comprising a plurality of terminals connected to a server via a communication network, the method comprising the steps of:
   receiving a request from a first terminal associated with a conference participant to identify a source terminal of a disturbing noise from among the plurality of terminals;
   receiving votes from at least some of the participants in the conference;
   identifying the source terminal, from the received votes, by determining that the source terminal received highest number of votes from among the plurality of terminals;
   determining whether a number of the received votes associated with the source terminal exceeds a predetermined threshold;
   based on the determination that the number of the received votes associated with the source terminal exceeds the predetermined threshold, automatically initiating an action to mute the source terminal; and
   transmitting to a user of the source terminal a notification associated with the action to mute the source terminal.

2. The method according to claim 1, further comprising:
   determining whether the user associated with the source terminal is actively or passively participating in the conference;
   initiating a first measure or a second measure for reducing the noise level associated with the source terminal based on the determination whether the at least one participant is actively or passively participating in the conference;
   wherein the step of initiating the first measure for reducing the noise level includes transmitting a message asking for silence to the source terminal and the step of initiating the second measure for reducing the noise level includes the action of muting the source terminal.

3. The method according to claim 1, wherein the terminals include computer devices, handheld devices, mobile phone devices, or stationary telephone devices.

4. The method according to claim 1, further comprising a step of recording noise associated with the source terminal for a period of time, after it has been detected that the noise level is above the threshold.

5. The method according to claim 4, wherein the step of identifying the source terminal further comprises a step of sending a notification to the server comprising information on a recording of the noise associated with the source terminal.

6. The method according to claim 1, wherein the notification associated with the action to mute the source terminal indicating that a predetermined noise level is exceeded and is to be reduced.

7. The method according to claim 1, further including collecting, by the server, noise level data of all the plurality of terminals that are logged into the communication network.

8. The method according to claim 1, further including:
   providing a button at each terminal of the plurality of terminals, the button, upon activation, being configured to trigger the step of detecting the noise level at the other terminals of the plurality of terminals; and
   when the button is activated at a selected terminal of the plurality of terminals, transmitting a location identifier associated with the selected terminal.

9. The method according to claim 8, further comprising: a step of analyzing the noise levels at or in the vicinity of the terminals of the plurality of terminals.

10. The method according to claim 1, wherein the server comprises an application for performing one of an Internet-based video or audio conference with a plurality of participants using the plurality of terminals being located at differing locations.

11. A system for reducing noise in a workspace, the system comprising:
   a server;
   a plurality of terminals connectable to the server via a communication network;
   a recording device associated with each of the plurality of terminals and configured to monitor noise emitted from or in the vicinity of each of the respective terminals, wherein the server is configured to:
   receive a request from a first terminal associated with a conference participant to identify a source terminal of a disturbing noise from among the plurality of terminals;
   receive votes from at least some of the participants in the conference;
   identify the source terminal, from the received votes, by determining that the source terminal received highest number of votes from among the plurality of terminals;
   determine whether a number of the received votes associated with the source terminal exceeds a predetermined threshold;
   based on the determination that the number of the received votes associated with the source terminal exceeds the predetermined threshold, automatically initiate an action to mute the source terminal; and
   transmit to a user of the source terminal a notification associated with the action to mute the source terminal.

12. A server to which a plurality of terminals are connectable via a communication network, the server being configured to:
   receive a request from a first terminal associated with a conference participant to identify a source terminal of a disturbing noise from among the plurality of terminals;
   receive votes from at least some of the participants in the conference;
   identify the source terminal, from the received votes, by determining that the source terminal received highest number of votes from among the plurality of terminals;
   determine whether a number of the received votes associated with the source terminal exceeds a predetermined threshold based on the determination that the number of the received votes associated with the source terminal exceeds the predetermined threshold, automatically initiate an action to mute the source terminal; and
   transmit to a user of the source terminal a notification associated with the action to mute the source terminal.

13. The system according to claim 11, wherein each of the plurality of terminals includes a button, and wherein activation of the button is configured to cause the server to begin determining whether a noise level associated with the source terminal is above a predetermined threshold.

14. The method according to claim 1, further comprising the steps of: detecting activation of a button associated with a selected terminal from the plurality of terminals; and triggering a voting process upon detecting the activation of the button at the selected terminal.

15. The method according to claim 14, wherein the button is a first button, and the method further includes:
- providing a second button at the source terminal, the second button, upon activation, being configured to notify the server that the at least one terminal is not associated with the noise level that exceeds the predetermined threshold; and
- when the second button is activated, identifying another terminal from the plurality of terminals, the another terminal being different from the source terminal and being associated with the noise level that exceeds the predetermined threshold.

16. The method according to claim 1, further comprising enabling each participant in the conference to find out if he is considered by others to be a source for the disturbing noise.

\* \* \* \* \*